United States Patent [19]

Nelson

[11] Patent Number: 4,828,366
[45] Date of Patent: May 9, 1989

[54] LASER-ADDRESSABLE LIQUID CRYSTAL CELL HAVING MARK POSITIONING LAYER

[75] Inventor: Erik K. Nelson, Centerville, Ohio

[73] Assignee: The Mead Corporation, Dayton, Ohio

[21] Appl. No.: 129,201

[22] Filed: Dec. 7, 1987

[51] Int. Cl.[4] .............................................. G02F 1/13
[52] U.S. Cl. ................................. 350/342; 350/350 S
[58] Field of Search .................... 350/350 S, 342, 351, 350/338; 250/331; 346/160

[56] References Cited

U.S. PATENT DOCUMENTS

| | | | |
|---|---|---|---|
| 3,999,838 | 12/1976 | Sprokel | 350/351 |
| 4,150,876 | 4/1979 | Yevick | 350/342 |
| 4,206,979 | 6/1980 | Jost | 350/342 |
| 4,228,449 | 10/1980 | Braatz | 350/342 |
| 4,239,348 | 12/1980 | Grinberg et al. | 350/342 |
| 4,470,669 | 9/1984 | Kubota et al. | 350/351 |
| 4,564,853 | 1/1986 | Egan | 346/160 |
| 4,787,713 | 11/1988 | Lu et al. | 350/342 |

FOREIGN PATENT DOCUMENTS

| | | | |
|---|---|---|---|
| 7315449 | 11/1974 | France | 350/342 |
| 0104115 | 6/1982 | Japan | 350/351 |
| 0010720 | 1/1983 | Japan | 350/342 |

OTHER PUBLICATIONS

W. Hornberger-"Liquid Crystal Display" IBM Technical Disclosure Bulletin—vol. 12—No. 10—Mar. 1970—pp. 1697-1698.

D. Armitage—"Numerical Solution of Heat Flow in the Laser-addressed Liquid-Crystal Display".

J. Appl. Physics-vol. 52—No. 7—Jul. 1981—pp. 4843-4851.

T. Vzabe et al.—"Laser-Adressed liquid crystal light valve with Dichroic Dye added as a Laser Beam Absorber".

J. Appl. Physics—vol. 54—No. 3—Mar. 1983—pp. 1152-1158.

Primary Examiner—Stanley D. Miller
Assistant Examiner—Tai V. Duong
Attorney, Agent, or Firm—Thomas A. Boshinski

[57] ABSTRACT

A laser-addressed liquid crystal cell is disclosed for recording image information in the form of a plurality of marks selectively positioned in accordance with a predefined pattern of pixels. The cell includes a layer of a liquid crystal material, and an infrared radiation absorbing material for producing heat in response to infrared radiation to create the marks by forming scattering regions in the liquid crystal material. A mark positioning layer is included, having infrared transmissive material and infrared non-transmissive material. These material are arranged within the mark positioning layer such that one of these two materials defines a series of discrete elements corresponding to the pattern of pixels. Such material is surrounded within the positioning layer by the other of the two materials.

11 Claims, 1 Drawing Sheet

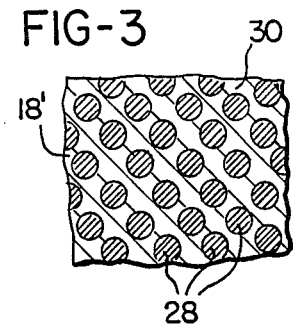
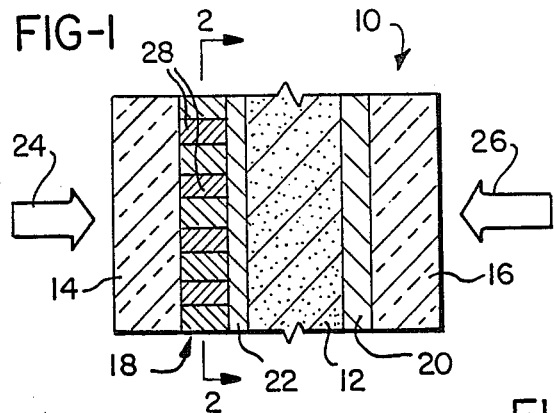
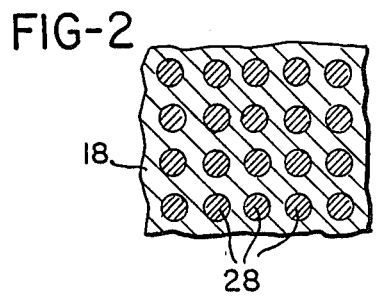
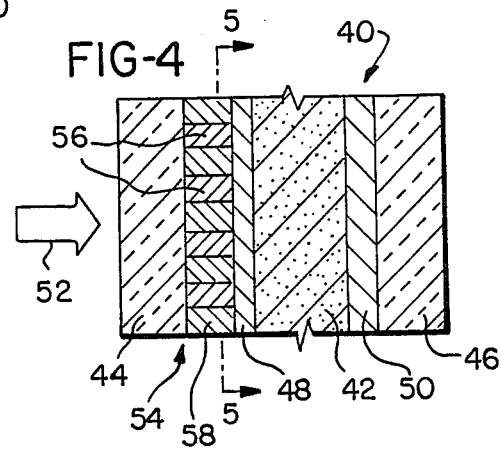
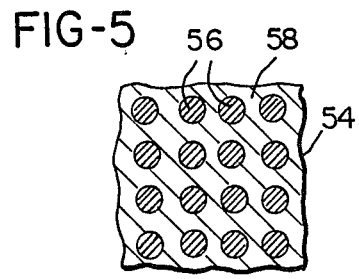
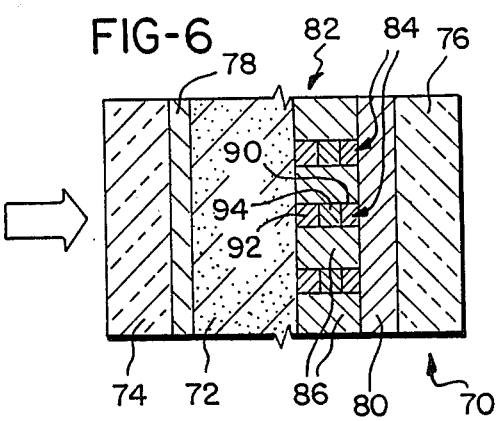

LASER-ADDRESSABLE LIQUID CRYSTAL CELL HAVING MARK POSITIONING LAYER

BACKGROUND OF THE INVENTION

The present invention relates generally to liquid crystal devices used in the recording of image information. More particularly, the invention relates to a liquid crystal cell upon which information can be written by a laser beam for subsequent viewing or projection.

Liquid crystal materials have received considerable attention over the past several decades as a result of the ability of such materials to be relatively easily transformed from a transparent state to a light-scattering state. Consequently, such materials have found use in the recording and/or display of image information.

Liquid crystal materials can generally be divided into several classes. One such class, known as smectic liquid crystals, possess a storage capability in that image information need be written onto a liquid crystal cell only once. The scattering regions which are created in recording the information are essentially static, and the written information is thereafter essentially permanent until erased.

Laser-addressed liquid crystal cells have been developed utilizing these smectic materials as high resolution projection and/or display devices. The writing mechanism on these devices is primarily thermal. A focused infrared laser beam is used to heat the smectic liquid crystal material into the isotropic state. Afterwards, the liquid crystal is cooled back to smectic state and forms a light-scattering region. The written scattering region is stable within the smectic temperature range of the specific liquid crystal material, and the written information will be preserved. The cell can be erased by an electric field or by a combined effect of heating and applied electric field.

The image information written onto the cell can be viewed by an observer of the cell. Also, and perhaps more importantly, visible light may be directed onto or through the cell following writing of the information, and any image can be projected onto a display screen, a photosensitive material, or the like. A variety of such devices are discussed in Dewey, "Laser-Addressed Liquid Crystal Displays," *Optical Engineering* 23(3), 230-240 (May/June 1984).

Two types of laser-addressed liquid crystal cells have been developed for use in conjunction with an infrared diode laser. Both are discussed in the referenced publication of Dewey. One such device, known as a reflective device, utilizes a thin film infrared absorber fabricated on one of the substrates of the liquid crystal cell. As the infrared beam is scanned across the absorber layer, the radiation is converted to heat to produce scattering regions within the cell. However, the thin film infrared absorber is opaque, not only to infrared radiation but also to the visible radiation used in projecting the finished image. Thus, the image written on the liquid crystal cell must be projected by reflecting the visible radiation off the cell.

A second type of device is commonly known as a transmissive device. Typically, an infrared absorption dye having its peak absorption at the laser wavelength is doped into the liquid crystal material. As the writing beam is scanned across the cell, the dye absorbs the laser radiation and converts it to heat. The dye has little or no effect on light of a visible wavelength. Thus the image written on such a device can be projected simply by passing projection light through the device in a manner similar to that used in an ordinary slide projector.

An alternative arrangement for a transmissive device is shown in copending, commonly-assigned application Ser. No. 53,216, filed May 22, 1987. A three-layer structure absorptive of the infrared writing beam but transparent to visible light is incorporated into the cell. The writing beam thus acts to create the scattering regions in the liquid crystal necessary to record image information. However, the visible projection beam passes with relatively low attenuation through the absorptive structure for projection of the image.

In any case, the image information is typically written onto the cell as a series of very small marks or dots which together comprise the complete image. The beam is scanned over the cell and modulated to produce the dots. One advantage to such an approach is that since the image information to be written is typically processed as a series of pixels, writing the information as a series of dots simplifies the manipulation of data. However, the writing beam must be precisely controlled in order to position the dots properly across the cell. Variations in scan rate or the accuracy of beam modulation can produce distortions, patterning, loss of resolution or other loss of information in the image output. Of course, the scanning mechanisms needed to avoid this situation are both complex and costly.

What is needed, therefore, is a means by which the liquid crystal cell can be addressed in a precise manner by a laser beam. The high degree of precision with which the cell is addressed by the laser must be both consistent and repeatable. Further, such an addressing means should be capable of such performance at reasonable cost and complexity.

SUMMARY OF THE INVENTION

In meeting this need, the present invention provides a laser-addressed liquid crystal cell for recording image information. Such information is recorded in the form of a plurality of marks selectively positioned on the cell in accordance with a predefined pattern of pixels.

The cell includes a layer of a liquid crystal material, and an infrared radiation absorbing means for producing heat in response to infrared radiation to create the marks by forming scattering regions in the liquid crystal material. A mark positioning layer is also included, the positioning layer including infrared transmissive material and infrared non-transmissive material. The transmissive and non-transmissive materials are arranged within the mark positioning layer such that one of these two materials defines a series of discrete elements corresponding to the pattern of pixels, the elements being surrounded by the other material. The infrared radiation absorbing means may be contained within the mark positioning layer, in which case the absorbing means is the infrared non-transmissive material. The infrared non-transmissive material forms the discrete elements. A reflective layer is disposed between the mark positioning layer and the liquid crystal material, and the cell operates in a reflective mode.

In an alternate embodiment, the cell may be constructed to operate in a transmissive mode, with the infrared non-transmissive material defined by a three-layer structure. A first layer of this structure is formed from a radiation absorbing material, a second layer is formed to be selectively reflective of infrared radiation, and a spacer layer is disposed therebetween.

As a further alternate embodiment, also operating as a transmissive cell, the cell may be constructed with the infrared radiation absorbing means being an infrared absorptive dye doped into the liquid crystal material. The infrared non-transmissive material is reflective to infrared radiation, with the infrared transmissive material forming the discrete elements of the mark positioning layer.

The infrared transmissive material may be defined by empty space, the elements being defined by holes in the infrared non-transmissive material.

Accordingly, it is an object of the present invention to provide a liquid crystal cell which is addressable by an infrared laser for the writing of image information onto the cell; to provide such a cell in which the image information is written in the form of series of discrete marks or dots cooperating to form an image; to provide such a cell in which the marks are formed in the cell in precise, predetermined locations having controlled sizes; to provide such a cell with which a relatively low precision laser scanning system may be used; and to provide such a cell which may be constructed for direct viewing or projection of the image, operating in the latter case in either a transmissive or reflective mode.

Other objects and advantages of the invention will be apparent from the following description, the accompanying drawings and the appended claims.

BRIEF DESCRIPTION OF THE DRAWINGS

FIG. 1 is a sectional view of a portion of a laser-addressed liquid crystal cell in accordance with the present invention, constructed for operation in a reflective mode;

FIG. 2 is a sectional view of one layer of the cell of FIG. 1, taken generally along line 2—2 of FIG. 1;

FIG. 3 is a view similar to FIG. 2, showing an alternate embodiment for the layer shown in section in FIG. 2;

FIG. 4 is a sectional view of an alternate embodiment of the cell, constructed for operation in a transmissive mode;

FIG. 5 is a sectional view of one layer of the cell of FIG. 4, taken generally along line 5—5 of FIG. 4; and FIG. 6 is a sectional view of a further alternate embodiment of the cell, also constructed for operation in a transmissive mode.

DETAILED DESCRIPTION OF THE PREFERRED EMBODIMENTS

The present invention provides a liquid crystal cell which is addressed by an infrared laser beam for the recording of data on the cell. Subsequent to recording, the cell itself may be viewed, or visible light may be directed onto the cell to project the image to an appropriate display or photosensitive media. The preferred embodiments described herein are particularly adapted for use in systems wherein the recorded image is to be projected. However, it will be readily apparent that the invention is applicable to cells intended for direct viewing.

The infrared laser used to address the cells described herein is preferably a diode laser producing a beam having a wavelength of 830 nm. Other appropriate lasers may be used, such as a Nd:YAG laser producing a beam having a wavelength of 1060 nm. The beam is scanned across the entire cell by an appropriate scanning means to write the image data onto the cell. The specific means by which the cell is addressed by the laser, and the specific means by which projection light is directed onto the cell, are unimportant to the invention described herein. However, one example of such means can be seen by reference to U.S. Pat. No. 4,564,853.

Referring now to FIG. 1, one embodiment of a liquid crystal cell constructed in accordance with the present invention is shown. The cell is specifically designed for use in the projection of written images with visible light, and operates in a reflective mode. The cell 10 contains a liquid crystal layer 12. Any suitable liquid crystal material of the smectic-A class may be used, with one preferred example being CBOA.

Cell 10 is supported by a pair of transparent substrate layers 14 and 16. Such layers are preferably formed from glass, and are coated with an anti-reflective material. Located between substrate layer 14 and liquid crystal material 12 is a mark positioning layer 18, the structure of which will be described in detail below. A conductive layer 20 is provided on the opposite side of liquid crystal material 12 adjacent substrate layer 16. Layer 20 is preferably formed from a transparent conductive material such as indium-tin oxide.

Located between positioner layer 18 and the liquid crystal material 12 is a reflective layer 22 which is preferably a thin metallic layer such as aluminum. Layers 20 and 22 together act as the conductor for use in erasing the liquid crystal cell. Accordingly, an electric field can be generated between layers 20 and 22 to realign the liquid crystal into a totally non-scattering state.

In use, infrared laser radiation from an appropriate source (not shown), such as a laser diode, is directed onto the cell from the direction indicated generally in FIG. 1 by arrow 24. As will be described, this radiation writes image information onto liquid crystal material 12 of the cell in the form of marks comprising scattering regions. Projection light is directed onto the written cell from the direction indicated generally by arrow 26. As is conventional with reflective cells, the projection light is reflected by layer 22 after passing through liquid crystal material 12. The projection light, now containing the image information, leaves cell 10 from the same side of the cell from which it entered Mark positioning layer 18 can be seen in greater detail by reference to FIG. 2. In a conventional reflective-type liquid crystal cell, layer 18 is formed entirely from a conductive material and is similar to layer 20. Indium-tin oxide material may be used for this layer if a Nd:YAG laser at 1060 nm wavelength is used for writing. Such material is non-transmissive to infrared radiation at this wavelength, and exhibits absorptive capabilities with respect to the infrared radiation. Accordingly, incoming laser radiation is absorbed by this layer at the locations where the radiation is incident, and the energy is converted to heat energy which is then applied to the liquid crystal layer. This heating creates the localized scattering regions in the liquid crystal necessary for writing of the image information.

For other writing beam wavelengths, other appropriate absorptive materials should be used in place of the indium-tin oxide.

In accordance with the present invention, however, the absorptive, non-transmissive material is not formed as a continuous layer, but rather as a series of discrete elements 28, arranged as shown in FIG. 2 in a precise rectangular array. Elements 28 are surrounded by non-absorptive, transmissive material 30. Any dielectric material not absorptive to light of the writing beam wavelength is preferred, although other suitable materials can be used.

Each element 28 of absorptive material within layer 18 is positioned to correspond to a desired pixel on liquid crystal layer 12. Because material 30 is non-absorptive, any infrared radiation incident upon this material will not be converted to heat. Thus, scanning of a laser beam over layer 18 will produce heating which in turn forms scattering regions in liquid crystal layer 12 that corresponds precisely to the location of elements 28 in layer 18. Each element 28 hence serves as a local heating zone for the liquid crystal material. Because the position of element 28 determines the location of the scattering zone on the cell, the accuracy of the pixels within the written image on the cell is determined by the location of elements 28 rather than the position and shape of the scanned laser beam.

In a typical configuration, each element 28 is of a diameter on the order of five microns, with the elements 28 being spaced on 12.5 micron centers. The exact diameter and spacing of the elements is determined in accordance with the capabilities of the laser scanning system and the desired resolution of cell 10.

In addition, the arrangement of elements 28 within layer 18 can be varied as desired. An alternative embodiment for layer 18 is shown as layer 18' in FIG. 3. Here, elements 28 are arranged in a hexagonal pattern rather than the rectangular pattern of FIG. 2.

The cross-sectional shape of elements 28 may also be varied to affect the written image. For example, diamond-shaped elements could be used to simulate the effects of a half-tone screen and improve tone continuity. A second embodiment of a liquid crystal cell in accordance with the present invention can be seen in FIG. 4 as cell 40. In this embodiment, cell 40 is designed to operate in a transmissive mode, and includes a layer of liquid crystal material 42 which is doped with a pleochroic dye absorptive of infrared radiation. Cell 40 is supported by glass substrates 44 and 46, and liquid crystal material 42 is surrounded by a pair of conductive layers 48 and 50. Such layers are preferably formed from indium-tin oxide, although the thickness of such layers is kept sufficiently small that any absorption of incoming infrared radiation is negligible.

In the operation of a conventional transmissive cell, an infrared writing beam is scanned over the cell from the direction generally indicated by arrow 52. The radiation is absorbed by the dye contained within the liquid crystal material 42, which produces heating within local areas of liquid crystal material 42. This in turn writes the image information into the liquid crystal in the form of scattering areas. Projection of the written image is made by visible light, which is also directed onto cell 40 from the direction of arrow 52.

In accordance with the present invention, a mark positioning layer 54 is located between glass substrate layer 44 and conductive layer 48. Layer 54 includes an infrared transmissive material positioned within layer 54 as discrete elements 56. Surrounding elements 56 is a non-transmissive material 58. Non-transmissive material 58 must, however, be transmissive to visible radiation for projection, and is therefore preferably a dichroic material which passes visible light and reflects the light from the writing laser.

Preferably, dichroic materials 58 may be a multi-layer structure having a stack of dielectric layers. The layers of the structure are formed from two or more different materials, and are stacked in alternating fashion. In a preferred embodiment, the odd numbered layers of the stack are formed from a material having a high index of refraction. Even numbered layers are each formed from a material having a relatively low index of refraction. Each layer of the stack is formed to have an optical thickness equal to a quarter wavelength of the laser light. In this way, the dichroic material may be specifically tuned to the incoming laser radiation.

Preferably, the total number of dielectric layers within the dichroic structure is at least seven. In one example, eleven layers are used, with the resulting structure demonstrating approximately 99% reflection at 830 nm and greater than 95% average transmission over the visible spectrum.

Transmissive elements 56 may be formed from a dielectric material such as silicon dioxide. Alternatively, elements 56 may be formed as "holes", consisting of empty space. In either case, incoming laser radiation will be passed through elements 56 into the liquid crystal material 42, where the dye converts the laser light into heat for writing image information. Thus, mark formation will correspond precisely to the location of transmissive elements 56 in layer 54. Laser light striking layer 54 on non-transmissive material 58 will be reflected, and will not reach liquid crystal material 42.

While the elements 56 shown in FIG. 5 are arranged in a rectangular pattern, it will be recognized that they can be arranged in a hexagonal pattern, similar to that shown in FIG. 3, or in any other appropriate manner.

A third alternate embodiment for the present invention can be seen by reference to cell 70 shown in FIG. 6. The cell includes a layer of liquid crystal material 72, and is supported by a pair of transparent substrate layers 74 and 76. Layers of transparent electrically conductive material 78 and 80 are positioned adjacent substrate layers 74 and 76, respectively. As with the conductive layers of the previous embodiments, layers 78 and 80 are preferably formed from indium-tin oxide, and together act as the conductor for use in erasing the liquid crystal cell.

Located between the liquid crystal material 72 and conductor layer 80 is a positioner/absorber layer 82. Layer 82 includes a plurality of absorber elements 84, with the absorber elements surrounded by an infrared transmissive material 86. Elements 84 are arranged within material 86 in a manner similar to that shown in either of FIGS. 2 or 3.

Each absorber element 84 provides strong absorption at the laser wavelength, while being visibly transparent. Laser radiation is directed onto cell 70 from the direction indicated by arrow 88, and as the radiation strikes absorber elements 84, heat is generated in the element. This heat then acts upon the liquid crystal material to create the localized scattering regions necessary to write the image information.

Each absorber element 84 consists of a three layer stack of dielectric and metal thin films. Each absorber element 84 includes a dielectric laser mirror 90, an absorbing layer 92, and a spacer layer 94 located therebetween. These three layers together form an interference cavity which, when properly tuned, can be made highly absorptive to the incident laser light. The element remains essentially transparent to visible light.

In the three-layer infrared absorber element 84, absorbing layer 92 cooperates with spacer 94 to receive the incoming infrared radiation. At the interface between absorbing layer 92 and the liquid crystal material 72, some light may be reflected. The remaining light passes through the absorbing layer 92 and into the spacer layer 94. This light is then reflected at the laser mirror 90, whereafter it returns to the absorbing layer/liquid crystal interface and interferes with the light reflected by this interface. The net amount of reflected light can be minimized by tuning the optical thickness of the spacer layer 94. In this way, more than 90% of the incident infrared radiation can be absorbed.

Laser mirror 90 is preferably formed as a multi-layer structure having a stack of dielectric layers. Such a mirror provides a high reflectivity to the infrared radiation, in the order of 95–99%, but is essentially transparent to visible light. The layers of the mirror are formed from two different materials, and are stacked in alternating fashion. In a preferred embodiment, the odd numbered layers of the stack are formed from a material having a high index of refraction. In one example, an appropriate material for these layers is $TiO_2$. Even numbered layers are each formed from a material having a relatively low index of refraction. One preferred example of such material is $SiO_2$. Each layer of the stack is formed to have an optical thickness equal to a quarter-wavelength of the laser light. In this way, the laser mirror is specifically tuned to the incoming radiation.

Further detail regarding the construction of the absorbing layer elements can be seen by reference to U.S. patent application Ser. No. 53,216, filed May 22, 1987, which is incorporated herein by reference.

Outside of the absorber elements 84, infrared radiation striking the transmissive material 86 will pass through cell 70 and have no effect on the image being written upon the liquid crystal material 72. Similarly, visible projection light striking any portion of layer 82 will be transmitted through the layer.

It will be recognized from the foregoing description that further alternate embodiments can be devised. What is important is that the positioner layer is used to properly locate the pixels of the written image on the liquid crystal layer. As an additional advantage, the discrete heated portions produced in the cells of the present invention can reduce thermal bridging between adjacent pixels which has been observed in the past with continuous absorptive layers. This in turn can lead to improved mark size control, enhancing the recorded information. While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A laser-addressed liquid crystal cell for recording image information in the form of a plurality of marks selectively positioned in accordance with a predefined pattern of pixels, said cell comprising:
    a layer of a liquid crystal material;
    infrared radiation absorbing means for producing heat in response to infrared radiation to create said marks by forming scattering regions in said liquid crystal material; and
    a mark positioning layer including infrared transmissive material and infrared non-transmissive material, said transmissive and non-transmissive materials being arranged within said mark positioning layer such that one of said transmissive and non-transmissive materials defines a series of discrete elements corresponding to said pattern of pixels surrounded by the other of said transmissive and non-transmissive materials.

2. The cell as defined in claim 1, wherein said infrared radiation absorbing means is contained within said mark positioning layer and is said infrared non-transmissive material, said infrared non-transmissive material forming said elements.

3. The cell as defined in claim 2, further comprising a reflective layer disposed between said mark positioning layer and said liquid crystal material.

4. The cell as defined in claim 3, further comprising a conductor layer formed from an electrically conductive material, said conductor layer disposed adjacent said liquid crystal layer opposite said mark positioning layer, said conductor layer forming a first conductor and said mark positioning layer and said reflective layer together forming a second conductor for use in creating an erasing electric field across said cell.

5. The cell as defined in claim 2, wherein said infrared non-transmissive material is defined by a three-layer structure having a first layer formed from a radiation absorbing material, a second layer formed to be selectively reflective of infrared radiation, and a spacer layer disposed therebetween.

6. The cell as defined in claim 1, wherein said infrared radiation absorbing means is an infrared absorptive dye doped into said liquid crystal material, and wherein said infrared non-transmissive material is reflective to infrared radiation, said infrared transmissive material forming said elements.

7. The cell as defined in claim 6, further comprising first and second conductor layers each formed from an electrically conductive material and disposed on opposite sides of said liquid crystal layer for use in creating an erasing electric field across said cell.

8. The cell as defined in claim 6, wherein said infrared transmissive material is defined by empty space, said elements being defined by holes in said infrared non-transmissive material.

9. A laser-addressed liquid crystal cell for recording image information in the form of a plurality of marks selectively positioned in accordance with a predefined pattern of pixels, said cell comprising:
    first and second transparent substrate layers for forming the outer surfaces of said cell;
    a layer of a liquid crystal material disposed between said first and second substrate layers; and
    infrared radiation absorbing means for producing heat in response to infrared radiation to create said marks by forming scattering regions in said liquid crystal material; and
    a mark positioning layer disposed between said layer of liquid crystal and said first substrate layer, said mark positioning layer including infrared transmissive material and infrared absorptive material, said transmissive and absorptive materials being arranged within said mark positioning layer such that said absorptive material defines a series of discrete elements corresponding to said pattern of pixels surrounded by said transmissive material.

10. The cell as defined in claim 9, further comprising a reflective layer disposed between said mark positioning layer and said liquid crystal layer.

11. A laser-addressed liquid crystal cell for recording image information in the form of a plurality of marks selectively positioned in accordance with a predefined pattern of pixels, said cell comprising:

first and second transparent substrate layers for forming the outer surfaces of said cell;

a layer of a liquid crystal material disposed between said first and second substrate layers;

an infrared absorptive dye doped into said liquid crytal material for producing heat in response to infrared radiation to create said marks by forming scattering regions in said liquid crystal material; and a mark positioning layer disposed between said layer of liquid crystal and said first substrate layer, said mark positioning layer including infrared transmissive material and infrared reflective material, said transmissive and reflective materials being arranged within said mark positioning layer such that said transmissive material defines a series of discrete elements corresponding to said pattern of pixels surrounded by said reflective material.

* * * * *